(12) United States Patent
Nagamasa et al.

(10) Patent No.: US 6,225,911 B1
(45) Date of Patent: May 1, 2001

(54) INFORMATION PROCESSING APPARATUS AND ITS CONTROL METHOD FOR COOLING INSIDE APPARATUS WITH FAN

(75) Inventors: Yoshinobu Nagamasa, Kawasaki; Shouichi Ibaraki, Toyko, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,179

(22) Filed: Jul. 27, 1999

(30) Foreign Application Priority Data

Jul. 30, 1998 (JP) .................................... 10-215690
Sep. 10, 1998 (JP) .................................... 10-256754

(51) Int. Cl.$^7$ .................................... G08B 21/00
(52) U.S. Cl. .................... 340/635; 340/648; 340/661; 340/663; 236/49; 236/1
(58) Field of Search ................ 236/49; 340/648, 340/635, 663, 661; 137/334, 338

(56) References Cited

U.S. PATENT DOCUMENTS

| | | | |
|---|---|---|---|
| 4,756,473 | * 7/1988 | Takemae et al. | 236/49 |
| 5,287,292 | * 2/1994 | Kenny et al. | 364/550 |
| 5,414,494 | 5/1995 | Aikens et al. | 355/202 |
| 5,438,226 | * 8/1995 | Kuchta | 307/125 |
| 5,534,854 | * 7/1996 | Bradbury et al. | 340/648 |
| 5,631,852 | * 5/1997 | Chen | 364/557 |
| 5,723,998 | * 3/1998 | Saito et al. | 327/513 |
| 5,761,085 | 6/1998 | Giorgio | 364/505 |
| 5,933,594 | * 8/1999 | La Joie et al. | 395/183.01 |
| 5,933,614 | * 8/1999 | Tavallaei et al. | 395/309 |
| 5,966,510 | * 10/1999 | Carbonneau et al. | 395/183.2 |
| 6,014,611 | * 1/2000 | Arai et al. | 702/132 |
| 6,023,402 | * 2/2000 | Kamilnski | 361/103 |

FOREIGN PATENT DOCUMENTS

| | | |
|---|---|---|
| 195 31 706 | 3/1997 | (DE) . |
| 0 214 297 | 3/1987 | (EP) . |
| 5-073164 | 3/1993 | (JP) . |

* cited by examiner

Primary Examiner—Daniel J. Wu
Assistant Examiner—Hung Nguyen
(74) Attorney, Agent, or Firm—Fitzpatrick, Cella, Harper & Scinto

(57) ABSTRACT

An information processing apparatus includes a fan sensor for detecting a failure of a fan for cooling an inside of the apparatus and for outputting a cooling fan failure signal, a counter for starting time counting when the cooling fan failure signal is output and for outputting a time-out signal when counting to a predetermined value, and a power supply unit for supplying a power to the information processing apparatus and for stopping the power supply responding to the time-out signal, so as to prevent electronic components from being damaged by heat. If a cooling fan failure signal is output, the apparatus notifies a user of the fan failure and of a stop warning and performs a software protective operation during time counting with the counter. The apparatus further includes a temperature sensor for checking the temperature in the apparatus and for outputting a temperature monitor signal, it notifies a user of an abnormal temperature and of how to cope with it if the temperature monitor signal is H and a cooling fan monitor signal is L and stops the power supply if both of the monitor signals are H, by which a user can be notified of the abnormal temperature independently of an abnormal operation of the cooling fan so as to remove the cause of the abnormality.

47 Claims, 8 Drawing Sheets

| FIG. 6A | FIG. 6B |

INFORMATION PROCESSING APPARATUS AND ITS CONTROL METHOD FOR COOLING INSIDE APPARATUS WITH FAN

BACKGROUND OF THE INVENTION

1. Field of the Invention

The present invention relates to an information processing apparatus such as a personal computer and its control method for cooling inside the apparatus with a cooling fan.

2. Related Background Art

On an information processing apparatus such as a personal computer, a cooling mechanism is generally mounted for cooling the entire apparatus or a CPU. As a cooling mechanism for this purpose, there is a heat sink or a cooling fan. As a heat release value is increased due to an improvement of a processing speed of the CPU in recent years, mainly a cooling fan or a heat sink with a cooling fan is used. If a cooling fan is stopped due to its failure during forced air-cooling with the cooling fan, a CPU or other electronic components may be damaged by heat.

Therefore, there is an information processing apparatus which monitors a temperature inside the apparatus, notifies the CPU that the temperature has reached a predetermined or higher level when detecting it, and disconnects a power supply unit with a control of the CPU.

In this type of an information processing apparatus, however, the power supply unit can be disconnected only under the condition that its software continues the normal operation, and therefore the power supply from the power supply unit cannot always be stopped at an abnormal temperature.

Accordingly to remove this disadvantage, as shown in FIG. 7, there has also been suggested an information processing apparatus in which a power supply unit 9 can be stopped even if a CPU 2 is not normally operating, by supplying a temperature abnormal signal from a temperature sensor 10 not only to the CPU 2 but to a counter 3, directly driving the counter 3 responding to the temperature abnormal signal from the temperature sensor 10, and halting the power supply unit 9 responding to a time-out signal from the counter 3 in addition to a control signal from the CPU via an OR circuit 8.

The above-described information processing apparatus, however, halts the power supply unit when detecting an abnormal temperature, and therefore if a cooling fan is stopped by a failure, a preparation for disconnecting the power supply unit is started after the temperature is increased up to a predetermined or higher level. Accordingly its electronic components may be damaged by heat before the power supply unit is disconnected.

On the other hand, if a temperature determined to be abnormal is set to a relatively low level so as to make allowance for the above increase of the heat, an upper temperature limit is forcibly lowered unnecessarily on the information processing apparatus as a condition under which the apparatus can be installed.

SUMMARY OF THE INVENTION

Therefore it is an object of the present invention to provide an information processing apparatus and its control method for preventing electronic components from being damaged by heat by stopping power supply in an early stage of a temperature increase caused by an abnormal operation of a cooling fan.

It is another object of the present invention to provide an information processing apparatus and its control method for notifying a user of an abnormal temperature so as to remove the cause of the temperature abnormality if it is not caused by an abnormal operation of the cooling fan.

According to one aspect, the present invention which achieves these objectives related to an information processing apparatus comprising a detecting means for detecting a failure of a cooling fan for cooling an inside of the information processing apparatus and outputting a failure detection signal, a time counting means for starting time counting when the fan failure detection signal is output from the detecting means and outputting a time-out signal when a predetermined time is counted, and a power supply means for supplying a power to the information processing apparatus and stopping the power supply when the time-out signal is output from the time counting means.

According to another aspect, the present invention which achieves these objectives relates to a control method of the information processing apparatus comprising the steps of outputting a failure detection signal when detecting a failure of a cooling fan for cooling an inside of the information processing apparatus, starting time counting with a time counter when the fan failure detection signal is output, outputting a time-out signal when the time counter counts a predetermined time, and stopping supplying power from a power supply unit to the information processing apparatus when the time-out signal is output.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

A preferred embodiment of the present invention will be described in detail below with reference to the accompanying drawings.

[First Embodiment]

Figure 1:
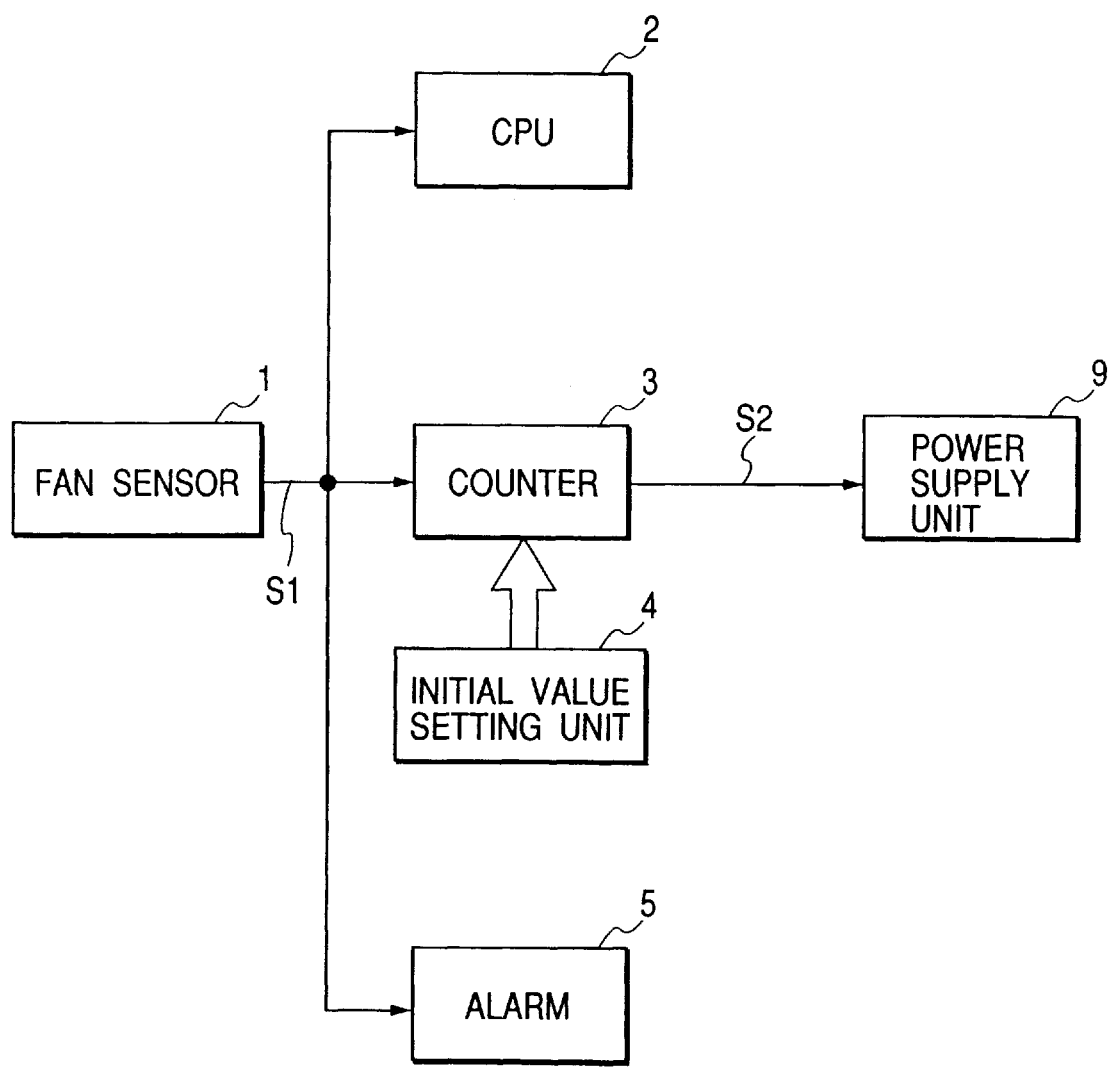
FIG. 1 is a block diagram of a constitution of an information processing apparatus according to a first embodiment.

Referring to FIG. 1, there is shown a block diagram of a constitution of an information processing apparatus according to a first embodiment.

In this diagram, a fan sensor 1, which is installed inside the information processing apparatus or inside a cooling fan (not shown) for cooling a CPU 2, always checks a status of the cooling fan and outputs a cooling fan monitor signal S1. The cooling fan monitor signal S1 is set so as to be L when the cooling fan is normal or to be H when the cooling fan is abnormal such as when a failure occurs in the cooling fan or when a rotor blade of the cooling fan is stopped by an accident to the cooling fan and a foreign object. The cooling fan can be installed either inside or outside the apparatus.

The CPU 2 is a general central processing apparatus for processing digital information.

An alarm 5 comprises light emitting diodes (LED's); a green LED goes on if the cooling fan monitor signal S1 is L, while a red LED goes on if it is H. A user can recognize whether or not the cooling fan is abnormal by the alarm 5 regardless of whether or not software is normally operating.

A counter 3 is a general down-counter; it loads an initial value from an initial value setting unit 4 while the cooling fan monitor signal S1 is L, and stops the loading of the initial value to start counting down from an initial value to zero when the cooling fan monitor signal S1 shifts to H. The counter 3 enters a time-out signal S2 to a power supply unit 9. If its count value becomes zero, the counter 3 changes the time-out signal S2 from L to H. By this operation, the time-out signal S2 can shift to H after a predetermined time has elapsed since the cooling fan monitor signal S1 shifted to H.

Accordingly by presetting as this predetermined time a time period during which a temperature does not increase up to a level at which components may be damaged after the cooling fan stops, the power supply unit is prevented from uselessly being stopped in a case that the cooling fan resumes a normal status within the predetermined time. As described later, if the CPU is normally operating, an appropriate terminating operation can be performed before the power supply unit is stopped, assuming the predetermined time to be a time period for a terminating operation required for protecting data.

In the above, the initial value set to the initial value setting unit 4 can be either a fixed value which has been previously set or an arbitrary value which a user can optionally set.

The power supply unit 9, which outputs a direct current used for the information processing apparatus, stops supplying power to the information processing apparatus when the time-out signal S2 shifts to H. The power supply unit 9 contains registers (a flip-flop, etc.) for keeping a state that the time-out signal S2 is H until a main switch is turned off so as to keep the power supply stop status of the power supply unit 9 even after the output of the time-out signal S2 is stopped together with the stop of power supply to the information processing apparatus.

Figure 2:
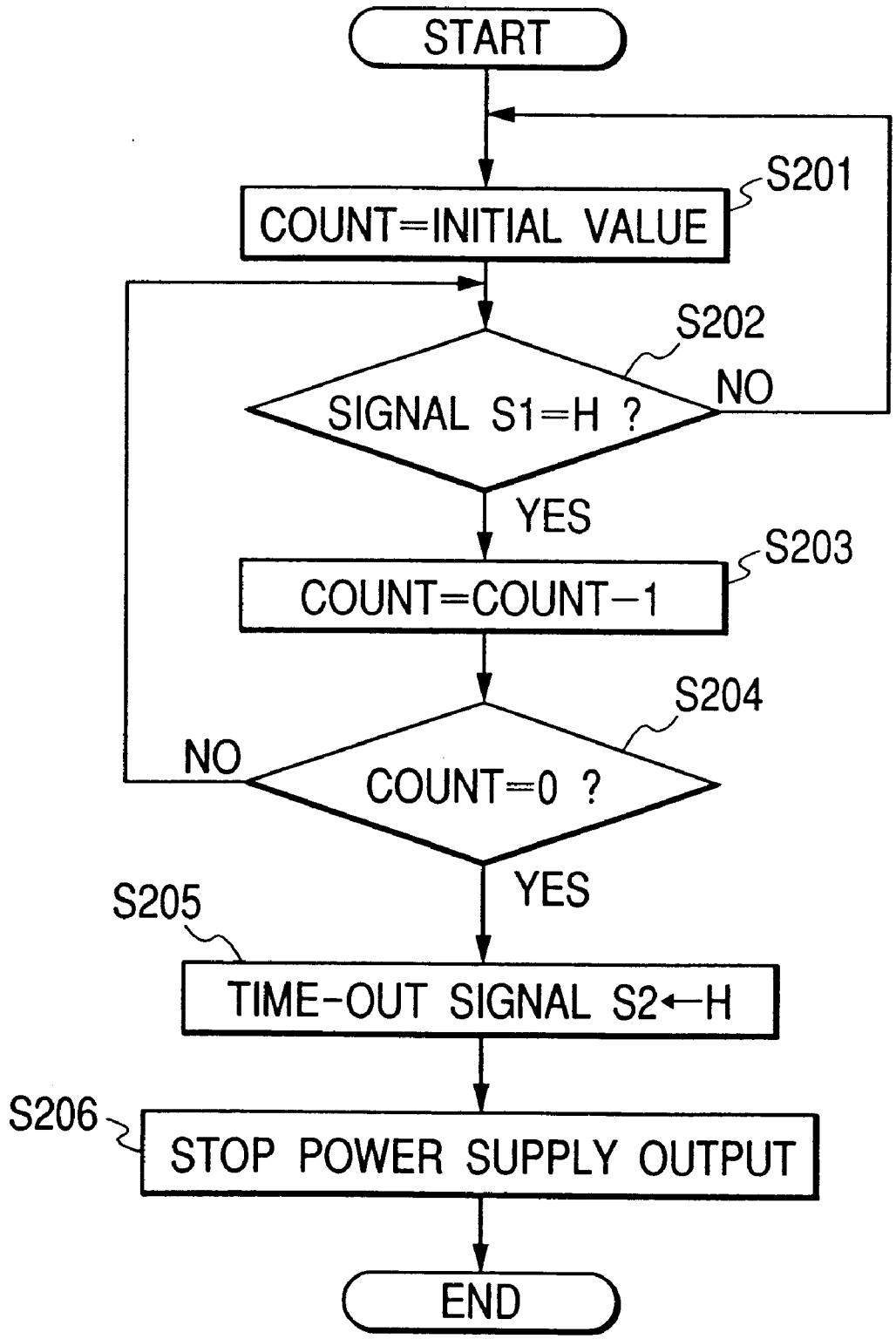
FIG. 2 is a flowchart of an operation procedure of the apparatus according to the first embodiment.

Referring to FIG. 2, there is shown a flowchart of an operation procedure of the first embodiment.

First, an initial value is loaded from the initial value setting unit 4 to the counter 3, and this processing is repeated while the cooling fan monitor signal S1 is L (steps S201 to S202). On the other hand, while the cooling fan monitor signal S1 is H, loading the initial value is stopped, and counting down is started from the initial value to zero (steps S202 to S204). When a content of the counter 3 becomes zero after a predetermined time has elapsed since the cooling fan monitor signal S1 shifted to H, the time-out signal S2 shifts from L to H (step S205). Responding to this, the power supply unit 9 stops the power supply to the information processing apparatus (step S206).

If the cooling fan resumes a normal status during counting down in a loop of steps S202 to S204 and the cooling fan monitor signal S1 shifts to L, the control branches from step S202 to step S201, and therefore the counter 3 stops the counting down, by which the initial value is loaded from the initial value setting unit 4 to the counter 3.

The power supply unit 9, which outputs a direct current used for the information processing apparatus, stops the power supply to the information processing apparatus (step S206) when the time-out signal S2 shifts to H (step S205). The power supply unit 9 contains registers (a flip-flop, etc.) for keeping a state that the time-out signal S2 is H until the main switch is turned off so as to keep the power supply stop status of the power supply unit 9 even after the output of the time-out signal S2 is stopped together with the stop of power supply to the information processing apparatus.

At this point, the CPU 2 is not concerned with the stop operation of the power supply unit 9 caused by the failure of the cooling fan described in the above. Accordingly, the power supply is reliably stopped even if the software does not normally operate, by which the electronic components of the information processing apparatus can be prevented from being damaged by heat. In addition, monitoring is applied not to an abnormal temperature, but to a failure of the cooling fan, which reduces an increase of the temperature in the information processing apparatus before the apparatus is stopped.

According to the embodiment described in the above, the power supply unit is stopped if a failure is detected in the cooling fan, by which the power supply unit can be stopped in an earlier stage than one in which a temperature in the apparatus is actually increased by the failure of the cooling fan, which reliably prevents the electronic components from being damaged by heat.

In addition, the power supply unit is stopped if the cooling fan continues to be abnormal for a predetermined or longer time since the abnormal cooling fan is detected, by which the power supply unit can be prevented from being stopped in such a case that the cooling fan has once stopped, but immediately recovers from the abnormal condition.

[Second Embodiment]

Figure 3:
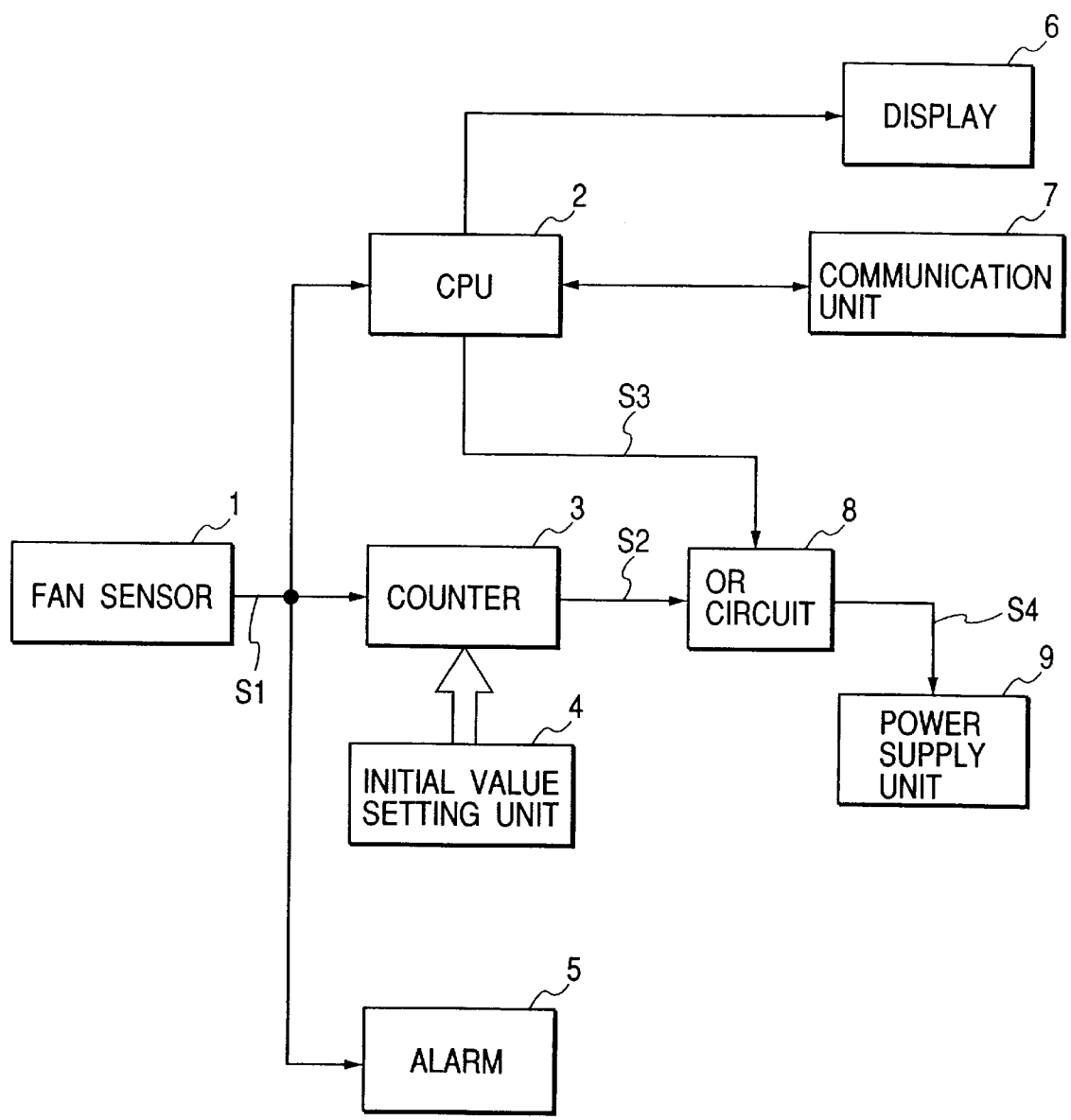
FIG. 3 is a block diagram of a constitution of an information processing apparatus according to a second embodiment.

Referring to FIG. 3, there is shown a block diagram of a constitution of an information processing apparatus according to a second embodiment.

In this diagram, a fan sensor 1, a counter 3, an initial value setting unit 4, and an alarm 5 are identical to the corresponding ones in the first embodiment. A power supply unit 9 is identical to one in the first embodiment except that a power supply stop signal S4 is entered instead of the time-out signal S2.

The CPU 2, which is a general central processing apparatus for processing digital information, displays a warning message on a display 6 such that the power supply unit 9 is stopped after an elapse of a predetermined time when the cooling fan monitor signal S1 shifts to H, normally terminates a running program, and performs a protective operation for storing data which has not been stored into a memory means which is not shown, during the normal operation of the control program of the information processing apparatus.

The CPU 2 may further notify other information processing apparatuses that a failure has occurred in the cooling fan and that the information processing apparatus will be stopped via a network or telephone lines connected to a communication unit 7. When the above protection and notification works are completed afterward, the CPU 2 may stop the power supply from the power supply unit 9 with a shift to H of the power supply control signal S3 which is normally set to L so as to cause the power supply stop signal S4 output from an OR circuit to be H, regardless of the operation of the counter 3. This operation makes it possible to further reduce an increase of the temperature in the information processing apparatus.

The OR circuit 8 checks the time-out signal S2 from the counter 3 and the power supply control signal S3 from the CPU 2 and outputs the power supply stop signal S4. This power supply stop signal S4 is set to be H when H is set to at least one of the time-out signal S2 and the power supply control signal S3 and set to be L in other cases.

Figure 4:
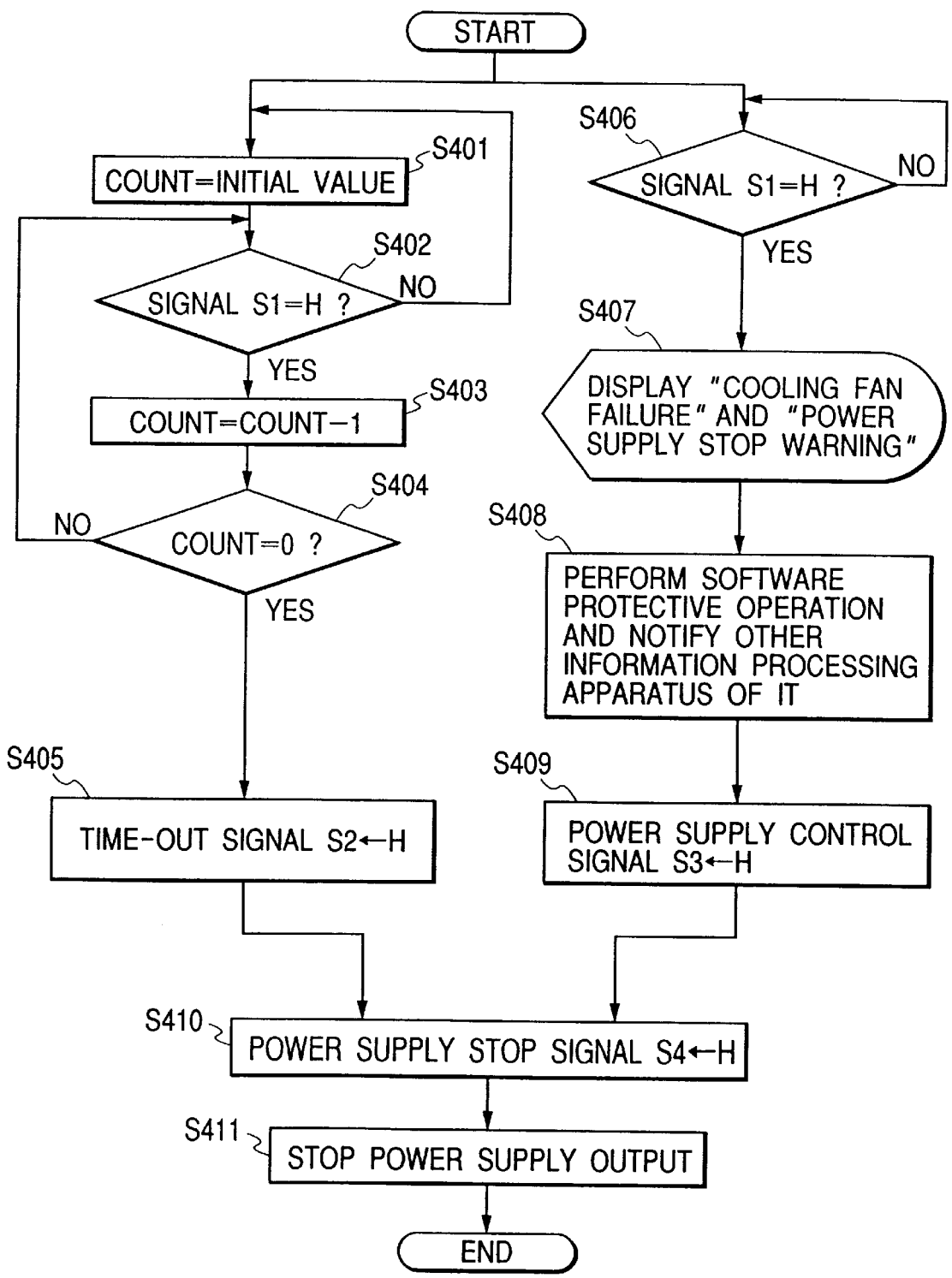
FIG. 4 is a flowchart of an operation procedure of the apparatus according to the second embodiment.

FIG. 4 shows a flowchart of an operation procedure of the second embodiment. Steps S401 to S405 are identical to the steps S201 to S205 in FIG. 2.

The CPU 2 displays a warning message on the display 6 such that a failure has occurred in the cooling fan and that the power supply unit 9 will be stopped after a predetermined time, when the cooling fan monitor signal S1 shifts to H during a normal operation of the control program of the information processing apparatus (steps S406 to S407). Furthermore, the CPU normally terminates the running program, stores data which has not been stored into a memory means which is not shown, and notifies other information processing apparatuses that a failure has occurred in the cooling fan and that the information processing apparatus will be stopped via a network or telephone lines connected to the communication section 7 (step S408). When the above works of the CPU 2 are completed afterward, the power supply control signal S3 which is normally L is changed to H regardless of the operation of the counter 3 (step S409).

When the power supply control signal S3 shifts to H, the power supply stop signal S4 output from the OR circuit 8 shifts to H (step S410), by which the power supply from the power supply unit 9 is stopped (step S410). This operation makes it possible to further reduce an increase of the temperature in the information processing apparatus. Naturally even before the CPU 2 terminates the above works, the time-out signal S2 shifts to H when the content of the counter 3 becomes zero (step S405), by which H is also set to the power supply stop signal S4 output from the OR circuit 8 (step S410), and therefore the power supply from the power supply unit 9 is stopped (step S411).

Accordingly even if the software does not normally operate during the above works of the CPU 2, the power supply is reliably stopped and therefore the electronic components of the information processing apparatus can be prevented from being damaged by heat, while if the software is normally operating, data is safely protected and further the CPU notifies a user of an occurrence of a failure by displaying it on the display 6 which comes in sight more easily than the alarm 5 and also notifies a user who is in a remote place through a communication unit 7, by which a remedy in an early stage can be applied in a repair or the like.

At this point, an initial value set to the initial value setting unit 4 is determined so that the above works of the CPU 2 can be completed during the counting operation.

While LED's are used as the alarm 5 so that a user can recognize a failure of the cooling fan regardless of whether the software is active or inactive, a light emitting device other than LED's, a sound generation device such as a buzzer, or a combination thereof may be used.

According to the embodiment described above, if a failure occurs in the cooling fan, the power supply can be stopped before the temperature in the apparatus is actually increased to be relatively high so as to prevent the electronic components from being damaged by heat, and an alarm independent of the software is provided to stop the power supply unit after a predetermined time has elapsed since a failure has been detected in the cooling fan, by which a user can be notified of an occurrence of the failure of the cooling fan within the predetermined time even if the software is not normally operating.

Furthermore, if the software is normally operating, it is displayed on the display that the information processing apparatus will be stopped because of the failure of the cooling fan or other information processing apparatuses are notified thereof within the predetermined time, by which a user, an operator, a serviceman or the like can easily be aware of a failure of the information processing apparatus and therefore the program can be normally terminated or data which has not been stored can be stored before the information processing apparatus is stopped.

[Third Embodiment]

Figure 5:
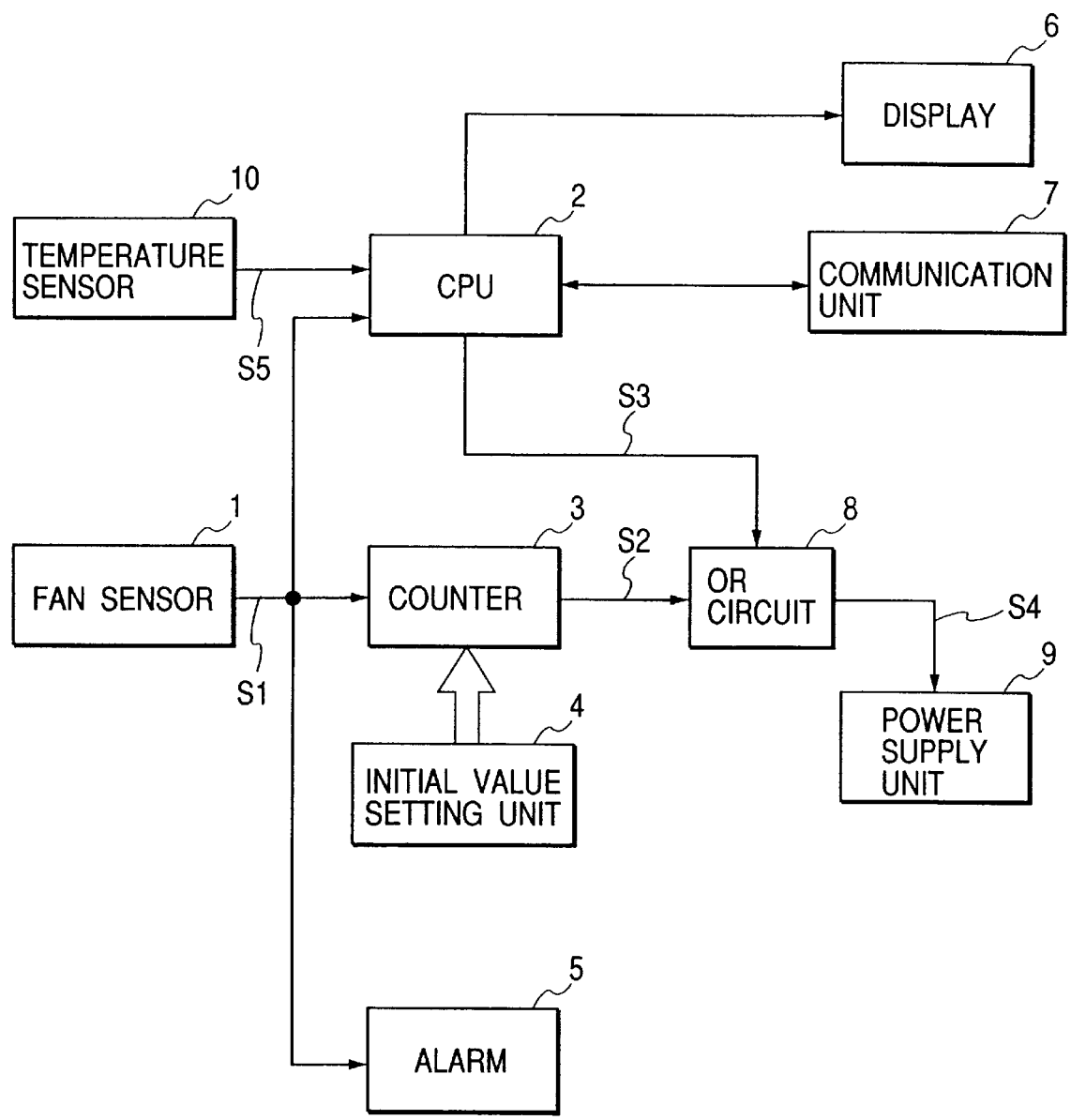
FIG. 5 is a block diagram of a constitution of an information processing apparatus according to a third embodiment.

Referring to FIG. 5, there is shown a block diagram of a constitution of an information processing apparatus according to this embodiment. This section omits a description of identical parts to those in the second embodiment and describes only different points from those in the second embodiment.

In this diagram, a temperature sensor 10 checks a temperature in the information processing apparatus and outputs a temperature monitor signal S5. The temperature monitor signal S5 is set to be L within a range of detected temperatures lower than a predetermined temperature and to be H at a temperature equal to or greater than the predetermined temperature. The CPU 2 monitors the temperature monitor signal S5 as well as a cooling fan monitor signal S1.

In this embodiment, the power supply output from the power supply unit 9 is stopped as a result of monitoring an abnormality of the temperature and a failure of the cooling fan, by which an increase of the temperature in the information processing apparatus can be reliably reduced before the information processing apparatus is stopped.

When the cooling fan monitor signal S1 shifts to H, the CPU 2 displays a warning message on a display 6 such that the power supply unit 9 is stopped after a predetermined time, normally terminates the running program, or stores data which has not been stored into a memory means which is not shown, regardless of a state of the temperature monitor signal S5. Furthermore, the CPU 2 may notify other information processing apparatuses that the cooling fan is abnormal and that the information processing apparatus will be stopped via a network or telephone lines connected to a connection unit 7.

When the above works of the CPU 2 are completed afterward, the CPU 2 may stop the power supply from the power supply unit 9 by a shift to H of the power supply control signal S3 which is normally L so as to cause the power supply stop signal S4 output from an OR circuit to be H, regardless of the operation of the counter 3. This operation makes it possible to further reduce an increase of the temperature in the information processing apparatus.

Naturally even before the CPU 2 terminates the above works, the power supply control signal S3 shifts to H when the content of the counter 3 becomes zero, by which H is also set to the power supply control signal S4 output from the OR circuit 8, and therefore the power supply from the power supply unit 9 is stopped. If the cooling fan is stopped, the temperature in the information processing apparatus will be rapidly increased, by which, however, the power supply is reliably stopped even if software is not normally operating during the above works of the CPU 2 and therefore it is possible to prevent electronic components of the information processing apparatus from being damaged by heat. On the other hand, if the software is normally operating, data can be safely protected and further the CPU notifies a user of an occurrence of the abnormality by displaying it on the display 6 which comes in sight more easily than the alarm 5 and also notifies a user who is in a remote place through a communication unit 7, by which a remedy in an early stage can be applied in a repair or the like.

The CPU 2 displays a warning message such that the temperature in the information processing apparatus is increased to be relatively high and how to cope with it on the display 6 when the cooling fan monitor signal S1 is L and the temperature monitor signal S5 shifts to H. Furthermore, the CPU 2 may notify other information processing apparatuses that the temperature in the information processing apparatus is abnormal via a network or telephone lines connected to a communication unit 7. By this operation, a user can check that a venting hole of the information processing apparatus is not clogged or that a room temperature is not relatively high in a place where the information processing apparatus is installed, so as to take a countermeasure for removing the temperature abnormality.

In addition, if the temperature abnormality is not removed for a predetermined or longer time, the CPU 2 may stop the power supply from the power supply unit 9 by shifting the power supply control signal S3 to H so as to cause the power supply control signal S4 output from the OR circuit 8 to be H. Naturally, before the stop of the power supply, the CPU may display a warning message on the display 6 such that the power supply unit 9 is stopped after a predetermined time, normally terminate the running program, store data which has not been stored into a memory means which is not shown, or notify other information processing apparatuses of an occurrence of the cooling fan failure and of stopping the information processing apparatus via a network or telephone lines connected to the communication unit 7.

An increase of the temperature caused by the above reason becomes at a peak at a certain temperature, by which there is little possibility that the electronic components will be damaged in comparison with a case of stopping the cooling fan and the cause of the abnormality can be easily removed by a user, and therefore the power supply output from the power supply unit 9 need not be stopped urgently. With a combination of the temperature sensor 10 and the fan sensor 1 as described above, urgent stops of the information processing apparatus not intended by a user can be controlled to the minimum of the requirement, in comparison with a prior art in which only a temperature sensor monitors the temperature.

Comparing with the monitoring only with the fan sensor 1, there are common capabilities of preventing the electronic components from being damaged and of controlling urgent stops of the information processing apparatus to the minimum of the requirement; in this embodiment, however, it is further possible to distinguish an abnormal temperature caused by an internal factor such as a failure of the cooling fan from an external factor such as an installation status, by which it is possible to appropriately advise a user.

Figures 6, 6A:
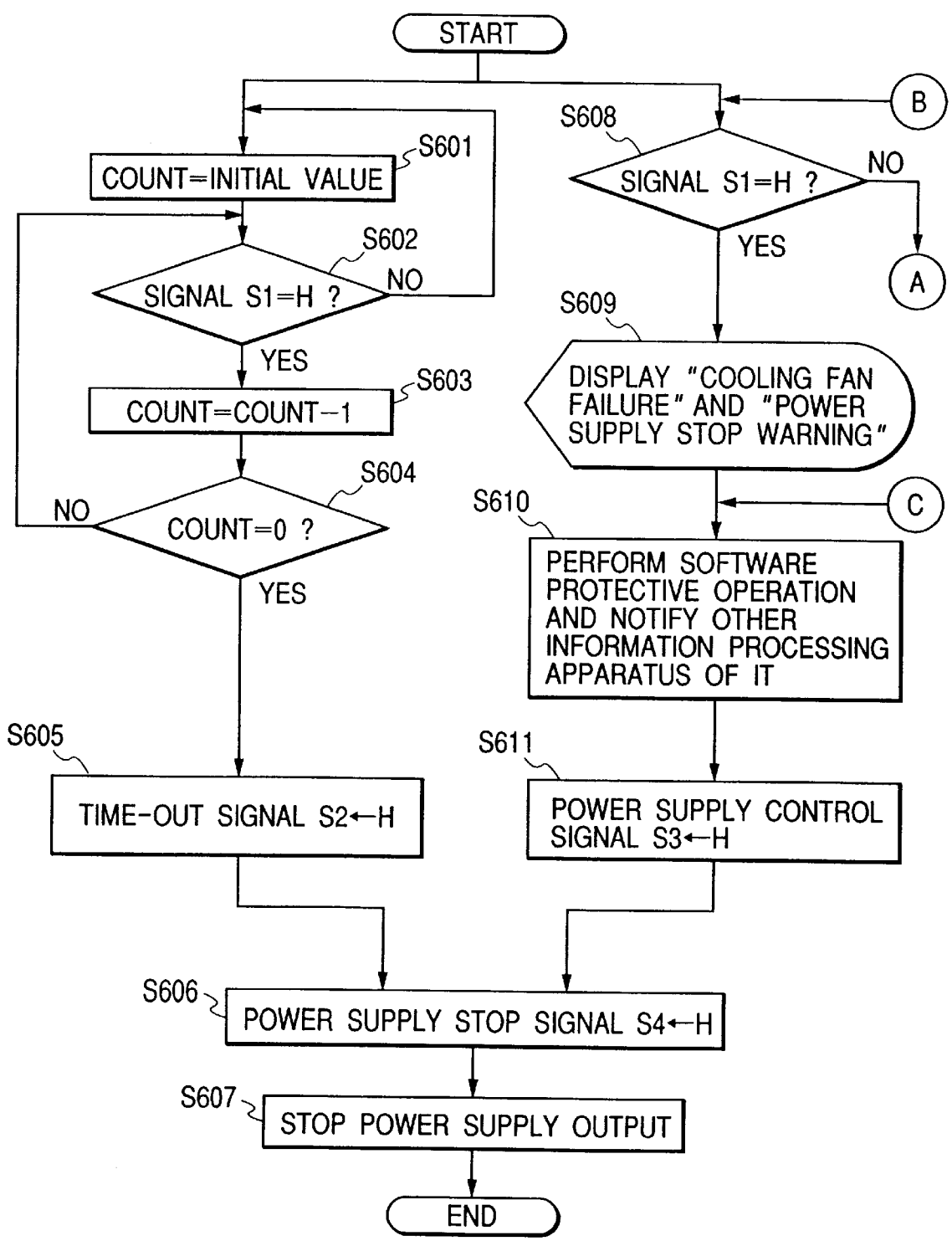
FIG. 6 is comprised of FIGS. 6A and 6B showing a flowchart of an operation procedure of the apparatus according to the third embodiment.
Figure 6B:
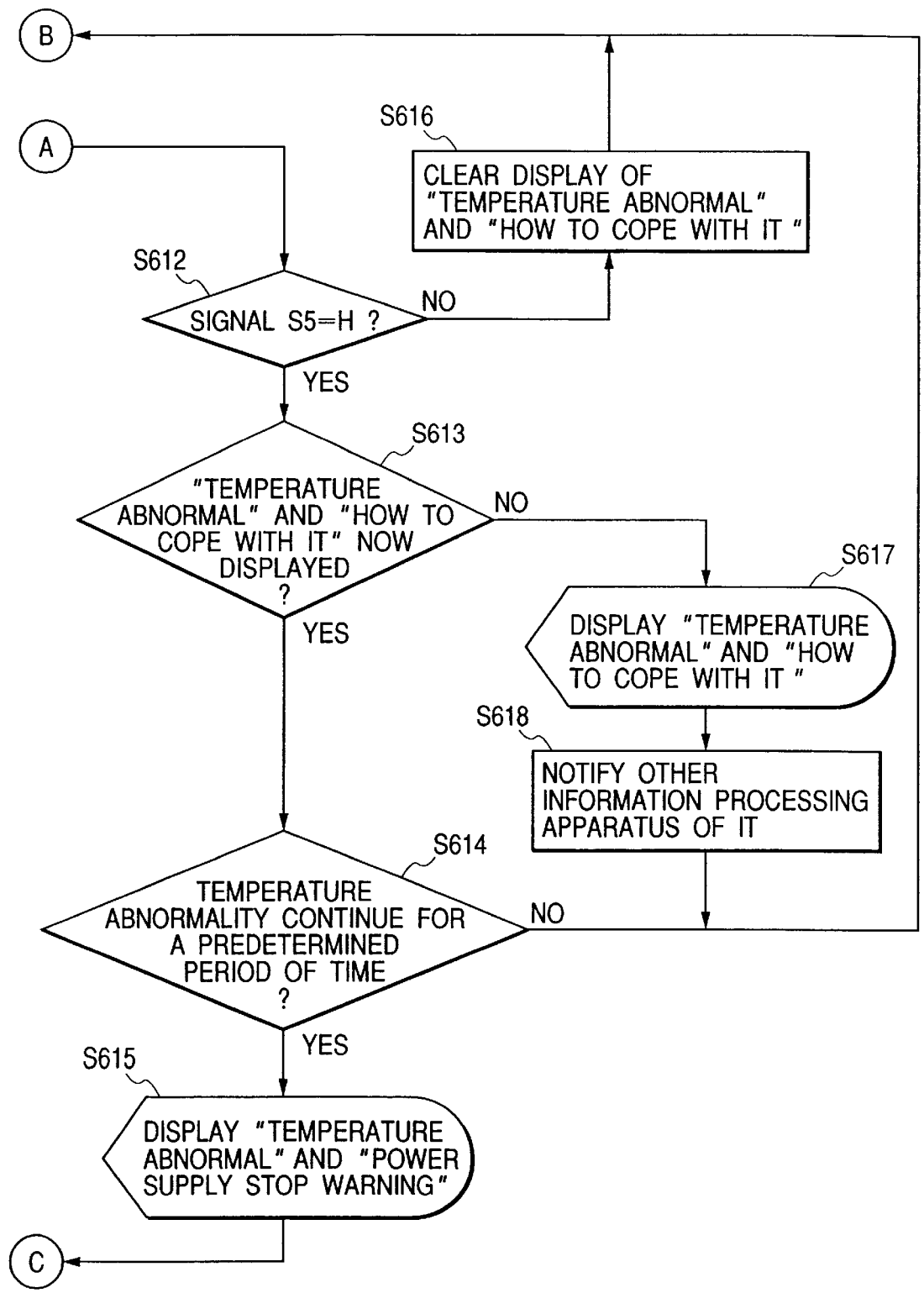
Figure 7:
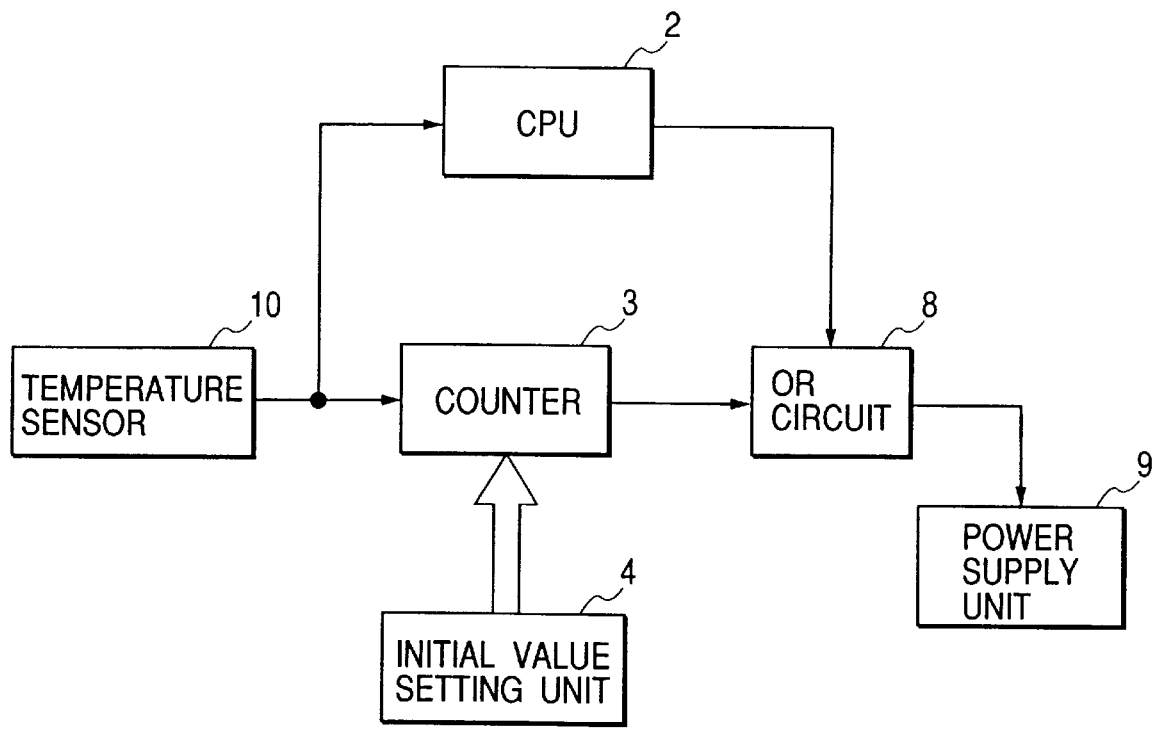
FIG. 7 is a block diagram of a constitution of a conventional information processing apparatus.

Referring to FIGS. 6A and 6B, there is shown a flowchart of an operation procedure according to this embodiment.

If the cooling fan monitor signal S1 is L, an initial value is loaded from an initial value setting unit 4 to the counter 3 (step S601), while if the cooling fan monitor signal S1 is H, the loading of the initial value is stopped and a predetermined time is counted by counting down from the initial value to zero (steps S602 to S604). If the content of the counter 3 becomes zero, the power supply control signal S2 shifts from L to H (step S605) to be entered in the OR circuit 8 and the power supply stop signal S4 shifts from L to H (step S606). If the cooling fan resumes the normal status during the count-down processing and the cooling fan monitor signal S1 becomes L, the counter 3 stops the counting down and the initial value is loaded from the initial value setting unit 4 to the counter 3 (steps S602 and S601).

Furthermore, the CPU 2 checks the cooling fan monitor signal S1 (step S608); the CPU 2 displays a warning message on the display 6 such that the power supply unit 9 is stopped after a predetermined time regardless of the status of the temperature monitor signal S5 when the cooling fan monitor signal S1 shifts to H, (step S609), normally terminates the running program, or stores data which has not been stored into a memory means which is not shown (step S610). Furthermore, the CPU 2 may notify other information processing apparatuses that a failure has occurred in the cooling fan and that the information processing apparatus will be stopped via a network or telephone lines connected to the communication unit 7. When terminating the above works afterward, the CPU 2 changes the power supply control signal S3 from L in the normal status to H regardless of the counter 3 (step S611).

In the power supply unit 9, the power supply control signal S3 shifts to H (step S611) and stops the power supply to the information processing apparatus (step S607), when the CPU 2 changes the power supply stop signal S4 to H (step S606) or when the content of the counter 3 becomes zero and the time-out signal S2 becomes H (step S605).

As described above, if the temperature sensor 10 detects an abnormal temperature, the CPU 2 stops the power supply from the power supply unit 9 after completing the above works, by which an increase of the temperature in the information processing apparatus can be reduced. Naturally even before the CPU 2 terminates the above works, the power supply from the power supply unit 9 is stopped after a predetermined time has elapsed since the fan sensor 1 detected a failure of the fan (when the content of the counter becomes zero).

If the cooling fan monitor signal S1 is L in step S608 and the temperature monitor signal S1 shifts to H in step S612, in other words, if the temperature is abnormal while the cooling fan is normal, the CPU 2 displays a warning message such that the temperature in the information processing apparatus is abnormally high and how to cope with it on the display (step S617). Additionally, the CPU 2 may notify other information processing apparatuses of the abnormal temperature in the information processing apparatus via a network or telephone lines connected to the communication unit 7 (step S618).

Accordingly, a user can recognize an increase of the temperature in the apparatus, check that a venting hole of the information processing apparatus is not clogged or that a room temperature is not relatively high in a place where the information processing apparatus is installed, so as to take a countermeasure for removing the temperature abnormality.

In addition, if the temperature abnormality is not removed for a predetermined or longer time, the CPU 2 may stop the power supply from the power supply unit 9 (step S607) by shifting the power supply control signal S3 to H (step S611) so as to cause the power supply stop signal S4 output from the OR circuit 8 to be H (step S606). Naturally, before the stop of the power supply, the CPU may display a warning message on the display 6 such that the power supply unit 9 is stopped after a predetermined time (step S615), normally terminate the running program, store data which has not been stored into a memory means which is not shown (step S610), or notify other information processing apparatuses of the cooling fan failure and of stopping the information processing apparatus via a network or telephone lines connected to the communication unit 7 (step S610).

If the cooling fan is stopped, the temperature in the information processing apparatus will be rapidly increased, by which, however, the power supply is reliably stopped even if software is not normally operating during the above works of the CPU 2 and therefore it is possible to prevent electronic components of the information processing apparatus from being damaged by heat. On the other hand, if the software is normally operating, data or the like can be safely protected and further the CPU notifies a user of an occurrence of an abnormality by displaying it on the display 6 which comes in sight more easily than the alarm 5 and also notifies a user who is in a remote place through a communication unit 7, by which a remedy in an early stage can be applied in a repair or the like.

While LED's are used as the alarm 5 so that a user can recognize a failure of the cooling fan regardless of whether the software is active or inactive, a light emitting device other than LED's, a sound generation device such as a buzzer, or a combination thereof may be used.

Furthermore, if electronic components easily damaged by a temperature increase at an occurrence of a cooling fan failure is mounted on the information processing apparatus, a cooling fan failure signal may be used as the power supply control signal S3 without the counter 3, the initial value setting unit 4, and the alarm 5 provided in this embodiment, so as to stop the power supply output from the power supply unit 9 immediately after a cooling fan failure is detected.

According to these embodiments as set forth hereinabove, if a failure occurs in the cooling fan, the power supply is stopped before the temperature in the apparatus is actually high, by which the electronic components can be prevented from being damaged by heat. Furthermore, the power supply unit is stopped after a predetermined time has elapsed since a failure of the cooling fan was detected, by which a user can be notified of the cooling fan failure during the time, and if the software is normally operating, it is possible to display a warning message on a display 6 such that the power supply unit 9 is stopped, to notify other information processing apparatuses thereof, to normally terminate the program, and to store data which has not been stored.

Furthermore, if the temperature in the information processing apparatus is relatively high when an abnormal temperature is detected while the cooling fan is normal, a user is notified of the abnormal temperature, and therefore the notified user can check, for example, that the venting hole of the information processing apparatus is not clogged or that the room temperature is not relatively high in a place where the information processing apparatus is installed and can remove the cause of the increase of the temperature, by which in a condition that the cooling fan is normal though the temperature is high so as not to increase the temperature rapidly, the temperature abnormality can be removed without an urgent stop of the information processing apparatus.

In addition, by stopping the power supply if a temperature abnormality is not removed for a predetermined or longer time while the fan is normal, it is possible to prevent a malfunction of the information processing apparatus such as that of the CPU caused by being exposed to a high temperature for a long time.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A cooling system for an information processing apparatus, comprising:

detecting means for activating a failure detecting signal in response to detection of a failure of a cooling fan for cooling an inside of the information processing apparatus:

time counting means for starting time counting when the fan failure detection signal is activated by said detecting means and outputting a time-out signal when a predetermined time is counted; and power supply means for supplying power to the information processing apparatus and stopping the power supply when the time-out signal is output from said time counting means, wherein said detecting means inactivates the failure detection signal in response to detection of restoration of the failed cooling fan, and said time counting means cancels the time counting when the fan failure detection signal is inactivated by said detecting means during the time counting.

2. A cooling system according to claim 1, further comprising alarm means for alarming of the failure of the cooling fan by means of an input of the fan failure detection signal.

3. A cooling system according to claim 2, wherein said alarm means includes a light emitting means.

4. A cooling system according to claim 2, wherein said alarm means includes a sound output means.

5. A cooling system according to claim 2, wherein said alarm means includes a combination of light emitting means and sound output means.

6. A cooling system according to claim 1, further comprising a CPU, wherein the fan failure detection signal is transmitted to the CPU.

7. A cooling system according to claim 6, further comprising display means for displaying a message to notify a user of stopping of the information processing apparatus when said CPU received the fan failure detection signal.

8. A cooling system according to claim 6, wherein said CPU performs a software protective operation when receiving the fan failure detection signal.

9. A cooling system according to claim 8, wherein the predetermined time is longer than a time period required for the software protective operation performed by said CPU.

10. A cooling system according to claim 8, wherein said CPU outputs a power supply stop signal when completing the software protective operation and said power supply means stops the power supply when the power supply stop signal is output.

11. A cooling system according to claim 6, further comprising communication means which can communicate with other information processing apparatuses, wherein said CPU notifies other information processing apparatuses of the cooling fan failure via said communication means when the fan failure detection signal is output.

12. A cooling system according to claim 11, wherein the predetermined time is longer than the time period required for said CPU to notify other information processing apparatuses.

13. A cooling system according to claim 11, wherein said CPU outputs the power supply stop signal when completing the notification to other information processing apparatuses and wherein said power supply means stops the power supply when the power supply stop signal is output.

14. A cooling system according to claim 11, wherein said CPU notifies other information processing apparatuses of the cooling fan failure and performs a software protective operation when the fan failure detection signal is output.

15. A cooling system according to claim 14, wherein the predetermined time is longer than the time period required for one of the notification to other information processing apparatuses and the software protective operation performed by said CPU or for both of them.

16. A cooling system according to claim 14, wherein said CPU outputs a power supply stop signal when completing one of the notification to other information processing apparatuses and the software protective operation or both of them and stops the power supply from said power supply means when the power supply stop signal is output.

17. A cooling system according to claim 1, wherein said cooling fan is arranged inside of the information processing apparatus.

18. A cooling system according to claim 1, wherein said time counting means is a time counting means for counting to a predetermined value corresponding to the predetermined time.

19. A cooling system according to claim 1, further comprising:
temperature failure detecting means for detecting an abnormal temperature in the information processing apparatus and outputting a temperature abnormal signal; and
notifying means for notifying a user of the abnormal temperature when the temperature abnormal signal is output without an output of the fan failure signal.

20. A cooling system according to claim 19, wherein said notification means notifies the user of the abnormal temperature and how to cope with the abnormal temperature.

21. A cooling system according to claim 20, wherein the coping method includes a change of an environment in which the information processing apparatus is installed.

22. A cooling system according to claim 19, wherein said notification means comprises a display means for displaying a message for notifying a user of the abnormal temperature.

23. A cooling system according to claim 19, wherein said notification means comprises communication means for notifying other information processing apparatuses of the abnormal temperature.

24. A cooling system according to claim 19, further comprising control means for outputting a power supply stop signal when the temperature abnormal signal has been continuously output for the second predetermined or longer time, wherein said power supply means stops the power supply when the power supply stop signal is output.

25. A cooling method for an information processing apparatus, comprising the steps of:
activating a fan failure detection signal when detecting a failure of a cooling fan for cooling an inside of the information processing apparatus;
starting time counting with a time counter when the fan failure detection signal is activated;
outputting a time-out signal when the time counter counts a predetermined time;
stopping supplying power from a power supply to the information processing apparatus when the time-out signal is output;
inactivating the failure detection signal when detecting restoration of the failed cooling fan; and
canceling the time counting with the time counter when the fan failure detection signal is inactivated during the time counting.

26. A cooling method according to claim 25, further comprising the step of alarming a user of the cooling fan failure when the fan failure detection signal is output.

27. A cooling method according to claim 26, wherein a user is alarmed by means of light emission for the cooling fan failure.

28. A cooling method according to claim 26, wherein a user is alarmed by means of a sound for the cooling fan failure.

29. A cooling method according to claim 26, wherein a user is alarmed by means of light emission and a sound for the cooling fan failure.

30. A cooling method according to claim 25, wherein the information processing apparatus includes a CPU and wherein the fan failure detection signal is transmitted to the CPU.

31. A cooling method according to claim 30, wherein the CPU displays a message for notifying a user of stopping the information processing apparatus when receiving the fan failure detection signal.

32. A cooling method according to claim 30, wherein the CPU performs a software protective operation when receiving the fan failure detection signal.

33. A cooling method according to claim 32, wherein the predetermined time is longer than a time period required for the CPU to perform the software protection operation.

34. A cooling method according to claim 32, wherein the CPU outputs a power supply stop signal when completing the software protective operation and stops the power supply from the power supply when the power supply stop signal is output.

35. A cooling method according to claim 30, wherein the CPU notifies other information processing apparatuses of the cooling fan failure when the fan failure detection signal is output.

36. A cooling method according to claim 35, wherein the predetermined time is longer than a time period required for the CPU to notify other information processing apparatuses.

37. A cooling method according to claim 35, wherein the CPU outputs a power supply stop signal when completing the notification to other information processing apparatuses and stops the power supply from the power supply when the power supply stop signal is output.

38. A cooling method according to claim 35, wherein the CPU notifies other information processing apparatuses of the cooling fan failure and performs a software protective operation when the fan abnormal detection signal is output.

39. A cooling method according to claim 38, wherein the predetermined time is longer than a time period required for one of the notification to other information processing apparatuses and the software protective operation performed by the CPU or for both of them.

40. A cooling method according to claim 38, wherein the CPU outputs a power supply stop signal when completing one of the notification to other information processing apparatuses and the software protective operation or both of them and stops the power supply from the power supply when the power supply stop signal is output.

41. A cooling method according to claim 25, wherein the time counting is performed by counting to a predetermined value corresponding to the predetermined time.

42. A cooling method according to claim 25, further comprising the steps of:
- detecting an abnormal temperature in the information processing apparatus and outputting a temperature abnormal signal; and
- notifying a user of the abnormal temperature when the temperature abnormal signal is output without an output of the fan failure signal.

43. A cooling method according to claim 42, wherein the notification of the abnormal temperature includes a notification of the abnormal temperature and of how to cope with the abnormal temperature.

44. A cooling method according to claim 43, wherein the coping method includes a change of an environment in which the information processing apparatus is installed.

45. A cooling method according to claim 42, wherein a message is displayed for notifying a user of the abnormal temperature in the notification of the abnormal temperature.

46. A cooling method according to claim 42, wherein other information processing apparatuses are notified of the abnormal temperature in the notification of the abnormal temperature.

47. A cooling method according to claim 42, wherein a power supply stop signal is output when the temperature abnormal signal has been continuously output for the second predetermined or longer time and wherein the power supply stops the power supply when the power supply stop signal is output.

* * * * *

UNITED STATES PATENT AND TRADEMARK OFFICE
CERTIFICATE OF CORRECTION

PATENT NO.    : 6,225,911 B1
DATED         : May 1, 2001
INVENTOR(S)   : Yoshinobu Nagamasa et al.

It is certified that error appears in the above-identified patent and that said Letters Patent is hereby corrected as shown below:

<u>Title page,</u>
Item [56], References Cited, U.S. PATENT DOCUMENTS, "Kamilnski" should read -- Kaminski --.
Item [75], Inventors: "Toyko" should read -- Tokyo, --.

Signed and Sealed this

Sixth Day of August, 2002

Attest:

JAMES E. ROGAN
Attesting Officer  Director of the United States Patent and Trademark Office